(12) United States Patent
Xu et al.

(10) Patent No.: US 11,791,632 B2
(45) Date of Patent: Oct. 17, 2023

(54) HIGH-FREQUENCY UNCONTROLLED RECTIFIER-BASED DC TRANSMISSION SYSTEM FOR OFFSHORE WIND FARM

(71) Applicant: ZHEJIANG UNIVERSITY, Zhejiang (CN)

(72) Inventors: Zheng Xu, Zhejiang (CN); Yingjie Tang, Zheijang (CN); Zheren Zhang, Zheijang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/298,341

(22) PCT Filed: Aug. 7, 2020

(86) PCT No.: PCT/CN2020/107725
§ 371 (c)(1),
(2) Date: May 28, 2021

(87) PCT Pub. No.: WO2021/082601
PCT Pub. Date: May 6, 2021

(65) Prior Publication Data
US 2022/0252046 A1 Aug. 11, 2022

(30) Foreign Application Priority Data
Oct. 30, 2019 (CN) .......................... 201911045255.9

(51) Int. Cl.
*H02J 3/00* (2006.01)
*H02J 3/36* (2006.01)
*H02J 3/38* (2006.01)

(52) U.S. Cl.
CPC .................. *H02J 3/36* (2013.01); *H02J 3/381* (2013.01); *H02J 2300/28* (2020.01)

(58) Field of Classification Search
CPC ........... H02J 3/381; H02J 3/36; H02J 2300/28
See application file for complete search history.

(56) References Cited

U.S. PATENT DOCUMENTS

2010/0156189 A1 6/2010 Fishman
2013/0200714 A1* 8/2013 Pan .......................... H02J 3/381
307/82

(Continued)

FOREIGN PATENT DOCUMENTS

| CN | 1776988 A | 5/2006 | |
| CN | 110829479 A | 2/2020 | |
| EP | 3820013 A4 * | 6/2022 | ............... H02J 3/36 |

OTHER PUBLICATIONS

International Search Report dated Sep. 27, 2020 issued for PCT/CN2020/107725.

(Continued)

*Primary Examiner* — Julio C. Gonzalez
(74) *Attorney, Agent, or Firm* — Hunton Andrews Kurth LLP (57) ABSTRACT

The present disclosure provides a high-frequency uncontrolled rectifier-based DC transmission system for an offshore wind farm, including a DC system and an offshore AC system. The offshore AC system mainly includes wind turbines based on permanent magnet synchronous generators with full-scale power converters, AC submarine cables, and offshore step-up stations. The DC system includes an offshore station and an onshore station that are connected by DC submarine cables, where a converter of the offshore is a three-phase six-pulse uncontrolled rectifier bridge, while a converter of the onshore station is MMC. Each of the offshore AC system and the offshore station has a rated frequency far above 50 Hz, which can usually be chosen to be in a range of about 100 Hz to 400 Hz. The disclosed transmission system allows for a great reduction in construction costs and demonstrating great application potentials in actual engineering.

7 Claims, 7 Drawing Sheets

(56) References Cited

U.S. PATENT DOCUMENTS

| | | | | |
|---|---|---|---|---|
| 2014/0092650 A1* | 4/2014 | Alston | ............... | H02J 3/36 |
| | | | | 363/35 |
| 2015/0333525 A1* | 11/2015 | Choi | ............... | H02J 3/36 |
| | | | | 700/287 |
| 2016/0013653 A1* | 1/2016 | Dorn | ............... | H02M 7/003 |
| | | | | 363/35 |
| 2019/0067949 A1* | 2/2019 | Maruyama | ............ | H02M 7/06 |

OTHER PUBLICATIONS

Chinese Office Action dated Oct. 10, 2020 issued to CN201911045255.9.

Sheng hui Cui et al., Onshore AC Grid Low Voltage Ride-Through (LVRT) of Diode-Rectifier Units based HVDC Transmission System for Offshore Wind Farms,2019 IEEE 10th International Symposium on Power Electronics for Distributed Generation Systems (PEDG) 22.8, pp. 934-938, Aug. 22, 2019.

L. Abrahamsson et al., HVDC Feeder Solution for Electric Railways [From the Internet] http://www.doc88.com/p-3117608126609.html, Jan. 22, 2016.

Soledad Bernal Perez et al., Efficiency and Fault Ride-Through Performance of a Diode-Rectifier- and VSC-Inverter-Based HVDC Link for Offshore Wind Farms, IEEE Transactions on Industrial Electronics, vol. 60, No. 6, pp. 2401-2409, Jun. 2013.

\* cited by examiner

HIGH-FREQUENCY UNCONTROLLED RECTIFIER-BASED DC TRANSMISSION SYSTEM FOR OFFSHORE WIND FARM

The present application claims priority to the Chinese Patent Application No. 201911045255.9, filed with the China National Intellectual Property Administration (CNIPA) on Oct. 30, 2019, and entitled "HIGH-FREQUENCY UNCONTROLLED RECTIFIER-BASED DC TRANSMISSION SYSTEM FOR OFFSHORE WIND FARM", the entire contents of which are incorporated herein by reference.

TECHNICAL FIELD

The present disclosure relates to the technical field of power transmission and distribution in electric power systems, and more particularly to a high-frequency uncontrolled rectifier-based DC transmission system for an offshore wind farm.

BACKGROUND

In recent years, China's renewable energy industries led by wind power have ushered in a golden period of development by benefiting from a series of policies. At present, wind power generation has grown with a share of over 7% in China's total installed power generation capacity and become the third biggest source of electric power, next only to thermal power and hydropower. Compared with onshore wind power, offshore wind power has numerous advantages: (1) commonly strong wind power at sea; (2) long generation duration of offshore wind power and high equipment utilization ratio; and (3) possible power peak shaving and valley filling according to regular rules of offshore wind power being conducive. Therefore, offshore wind power is expected to become a new driving force for the development of China's wind power industry.

Increasingly explicit policies on offshore wind power, continuous optimization of construction costs and gradually maturing supporting industries all contribute to the accelerated development of China's offshore wind power. In 2018, the development of China's offshore wind power was further sped up, resulting in 436 newly installed generator sets, with the new installed capacity of 1.655 million kilowatts in a year-on-year growth rate of 42.7%, and the cumulative installed capacity of 4.445 million kilowatts. At present, most of completed offshore wind farms are near the shore. In future, it is desirable to develop offshore wind power toward the sea far away from the shore. On the one hand, near-shore wind power is more liable to be restricted by increasingly environment ecology and thus limited in development space; and on the other hand, the farther away from the shore, the wider the range on the sea, hence richer wind energy resources and more stable wind velocity. By developing deep sea far away from the shore, richer wind energy resources can be fully utilized, and shoreline and sea-route resources can be saved, thereby reducing or avoiding negative influence on coastal industrial production and the lives of residents.

Most of the inshore wind farms under operation at present transmit the generated power with alternating current (AC) systems, and long-distance large capacity wind power transmission with AC systems is generally considered as having the following problems: (1) high construction costs of AC lines and great power losses as compared with transmission based on a direct current (DC) system; (2) actually infeasible long-distance AC transmission due to obvious capacitance effect in submarine cable lines; and (3) direct influence of AC network fault, if occurring, on the operation of the wind farms, which would be adverse to the reliability of the AC networks and the wind farms. According to existing research achievements, in case of a distance of over 90 km far away from the shore and the wind farm capacity of more than 100 MW, high-voltage DC connection of the wind farm to the grid would be a suitable scheme.

So far, almost all of the produced offshore wind power is transmitted with voltage source converter-based HVDC (VSC-HVDC) systems. To further reduce the cost of a wind power transmission system far away from the shore, the research on low-cost converters has attracted more and more attention from academic and industrial circles in recent years. Offshore wind power transmission system can be Line commutated converter-based HVDC systems with additional reactive power compensators, or hybrid DC power transmission systems, or can be built with diode rectifier bridges. The existing low-cost converters mainly have the following problems: (1) the rated frequency of an offshore AC system may be about 50 Hz, and both the step-up transformer on the offshore step-up platform and the converter transformer in the offshore rectifier station have relatively large volumes; and (2) the low-cost converters need to be installed with additional reactive power compensator and AC filters, which further increase the size and weight of the offshore converter station. Therefore, there is rarely a consensus on the existence of a low-cost converter solution capable of completely replacing the conventional VSC-HVDC system.

Until now, most of the disclosed documents basically focus only on the study of control strategies for various offshore wind power transmission system. Hence, it is quite necessary to study low-cost converter based offshore wind power transmission system so as to further bring the technical advantages of the offshore wind power transmission system into full play.

SUMMARY

An objective of the present disclosure is to provide a high-frequency uncontrolled rectifier-based DC transmission system for an offshore wind farm. According to this scheme, the rated frequency of the offshore AC system is increased to a level far above 50 Hz, so that transformers, reactive power components and AC filters on the offshore platform can be reduced in size and weight, allowing for a great reduction in construction costs and demonstrating great application potentials in actual engineering.

The technical solution of the present disclosure is as follows:

A high-frequency uncontrolled rectifier-based DC transmission system for an offshore wind farm includes a direct current (DC) system and an offshore alternating current (AC) system, where the DC system includes an offshore converter station and an onshore converter station; the offshore AC system includes wind turbines, AC submarine cables, and offshore step-up stations;

the wind turbines are connected to lower voltage sides of the offshore step-up stations by means of the AC submarine cables; high voltage sides of the offshore step-up stations are connected to an AC bus of the offshore converter station by means of the AC submarine cables; the offshore converter station is connected to the DC side of the onshore converter station by means of DC submarine cables; each of the offshore AC system and the offshore converter station has a rated frequency ranging from 100 to 400 Hz; parameters of a step-up transformer in the offshore step-up station are adaptive to the rated frequency of the offshore AC system; and parameters of a converter transformer in the offshore converter station are adaptive to the rated frequency of the offshore converter station.

Optionally, the DC system has a symmetrical monopolar structure, and a grounding device is installed only at a valve side of a converter transformer of the onshore converter station.

Optionally, the wind turbine is a wind turbine based on a permanent magnet synchronous generator with full-scale power converters.

Optionally, the offshore converter station includes a first AC bus, first converter transformers, first converters, an AC filter, and two first smoothing reactors;

the first AC bus is connected to AC sides of the first converters by means of the first converter transformers; the first converters include a positive converter and a negative converter; a DC side high voltage terminal of the positive converter is connected to a positive DC submarine cable by means of one first smoothing reactor, while a DC side low voltage terminal of the positive converter is connected to a DC side high voltage terminal of the negative converter; and a DC side low voltage terminal of the negative converter is connected to a negative DC submarine cable by means of the other first smoothing reactor.

Optionally, the AC filter is mounted on the first AC bus; the AC filter is a single tuned, double tuned or triple tuned filter, or in a capacitor-only form; and the total reactive power of all the AC filters at a rated fundamental voltage is 10% of rated DC power of the offshore converter station.

Optionally, the first converter is a three-phase six-pulse uncontrolled rectifier bridge, each arm of which is composed of a plurality of diodes connected in series and parallel;

two first converter transformers are used; AC bus side windings of the two first converter transformers are connected in the same configuration; and converter side windings of the two first converter transformers are connected in different configurations, with a phase difference of $(2k+1)*30°$, $k=0, 1, 2, \ldots, 5$.

Optionally, the onshore converter station includes a second AC bus, a second converter transformer, a second converter, and two second smoothing reactors;

the second AC bus is connected to an AC terminal of the second converter by means of the second converter transformer; a DC side high voltage terminal of the second converter is connected to a positive DC submarine cable by means of one second smoothing reactor, while a DC side low voltage terminal of the second converter is connected to a negative DC submarine cable by means of the other second smoothing reactor; the second converter is a modular multilevel converter (MMC); an AC bus side winding of the second converter transformer is connected in Y0-configuration; and a valve side winding of the second converter transformer is connected in Δ-configuration plus a star-connected reactor, or in Y-configuration with large resistance grounding at neutral point.

Optionally, a control system is used to perform constant power control on a grid side converter of the wind turbine; the control system includes four parts: a power controller, an outer-loop controller, an inner-loop controller, and a trigger link, where each of the power controller, the outer-loop controller, the inner-loop controller and the trigger link has d-axis and q-axis control dimensions;

an active power reference value $P_{ref}$ and a measured active power value P of the wind turbine are input as d-axis components of the power controller; the active power reference value $P_{ref}$ and the measured active power value P of the wind turbine are subtracted from each other and then subjected to proportion-integral (PI) control, thus producing an output of $\Delta U_{dref}$, $\Delta U_{dref}$ is added to a d-axis voltage rating $U_{dref()}$, resulting in a d-axis voltage reference value $U_{dref}$; a reactive power reference value $Q_{ref}$ and a measured reactive power value Q of the wind turbine are input as q-axis components of the power controller; the reactive power reference value $Q_{ref}$ and the measured reactive power value Q of the wind turbine are subtracted from each other and then subjected to proportional control, thus producing an output of q-axis voltage reference value $U_{qref}$;

a d-axis component $U_d$ and a q-axis component $U_q$ of an AC output voltage of the grid side converter, and the d-axis voltage reference value $U_{dref}$ and the q-axis voltage reference value $U_{qref}$ are input to the outer-loop controller; the d-axis voltage reference value $U_{dref}$ and the d-axis component $U_d$ of the AC output voltage of the grid side converter are subtracted from each other and then subjected to PI control, thus producing an output of d-axis current reference value $i_{dref}$, the q-axis voltage reference value $U_{qref}$ and the q-axis component $U_q$ of the AC output voltage of the grid side converter are subtracted from each other and then subjected to PI control, thus producing an output of q-axis current reference value $i_{qref}$;

a d-axis component $i_d$ and a q-axis component $i_q$ of an AC output current of the grid side converter, the d-axis current reference value $i_{dref}$ and the q-axis current reference value $i_{qref}$; and the d-axis AC output voltage component $U_d$ and the q-axis AC output voltage component $U_q$ are input to the inner-loop controller; the d-axis current reference value $i_{dref}$ and the d-axis AC output current component id are subtracted from each other and then subjected to PI control, thus producing an output result which is added to $U_d$-$i_q$*X, resulting in a d-axis voltage modulated waveform $U_{vdref}$, the q-axis current reference value $i_{qref}$ and the q-axis AC output current component iq are subtracted from each other and then subjected to PI control, thus producing an output result which is added to $U_q$+$i_d$*X, resulting in a q-axis voltage modulated waveform $U_{vqref}$, where X denotes connection reactance of the grid side converter; and the d-axis voltage modulated waveform $U_{vdref}$ and the q-axis voltage modulated waveform $U_{vqref}$ are input to the trigger link and then subjected to dq/abc transformation and pulse width modulation (PWM), thus outputting trigger signals to different switching elements in the grid side converter.

Compared with the prior art, the present disclosure has the following advantages:

(1) Directed to DC transmission for wind power far away from the shore, the present disclosure provides a high-frequency uncontrolled rectifier-based DC transmission scheme for an offshore wind farm, which, as compared with the conventional flexible DC transmission schemes, has the advantage of simple structure and can play a guiding role in future engineering design to a certain extent.

(2) Unlike existing conventional schemes, the rated frequencies of the offshore converter station 1 and the offshore AC system are increased, so that transformers, reactive power components and AC filters on the offshore platform can be reduced in size and weight, allowing for a great reduction in construction costs and demonstrating great application potentials in actual engineering.

BRIEF DESCRIPTION OF THE DRAWINGS

The present disclosure will be further illustrated below with reference to the accompanying drawings.

DETAILED DESCRIPTION

The technical solutions in embodiments of the present disclosure will be described in detail with reference to the accompanying drawings in the embodiments of the present disclosure. Apparently, the described embodiments are merely a part of rather than all the embodiments of the present disclosure. All other embodiments derived from the embodiments in the present disclosure by a person of ordinary skill in the art without creative work shall fall within the protection scope of the present disclosure.

Figure 1:
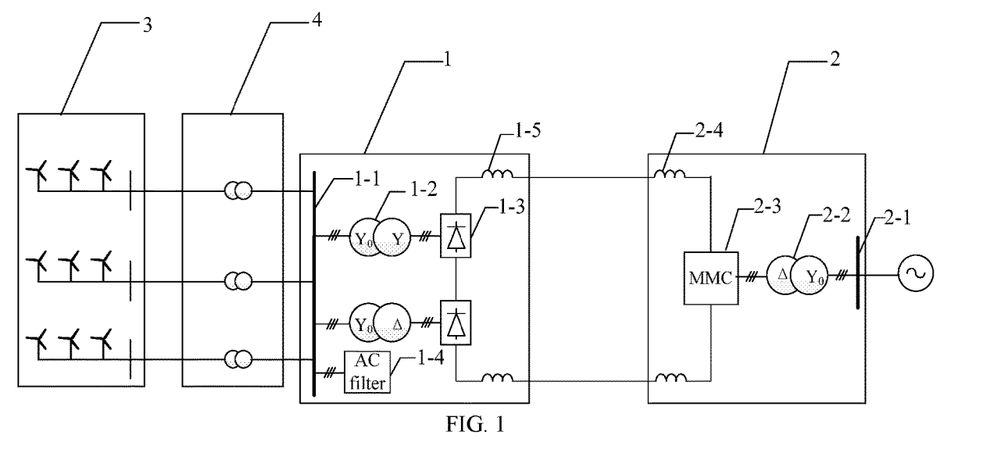
FIG. 1 is a structural schematic diagram of a high-frequency uncontrolled rectifier-based DC transmission system for an offshore wind farm according to an embodiment of the present disclosure.

As shown in FIG. 1, a high-frequency uncontrolled rectifier-based DC power transmission system for an offshore wind farm provided in the present disclosure includes a DC system and an offshore AC system.

The DC system includes an offshore converter station 1 and an onshore converter station 2 that are connected by DC submarine cables. The DC system has a symmetrical monopolar structure, i.e., no additional DC grounding electrode is installed in the DC system, and instead, a grounding device is installed at the valve side of a converter transformer of the onshore converter station 2.

The offshore converter station 1 is comprised of a first AC bus 1-1, first converter transformers 1-2, first converters 1-3, AC filters 1-4, and first smoothing reactors 1-5. The first AC bus 1-1, serving as the AC bus for the converter station, is connected to the AC terminals of the first converters 1-3 by means of the first converter transformers 1-2. Typically, it is desirable to install two first converters 1-3 for the installed offshore converter station 1, one positive and one negative, where the DC side high voltage terminal of the positive converter is connected to the positive DC submarine cable by means of one first smoothing reactor 1-5, while the DC side low voltage terminal of the positive converter is connected to the DC side high voltage terminal of the negative converter. The DC side high voltage terminal of the negative converter is connected to the negative DC submarine cable by means of the other first smoothing reactor 1-5. The rated frequency of the offshore converter station 1 is chosen to be 150 Hz.

Figure 2:
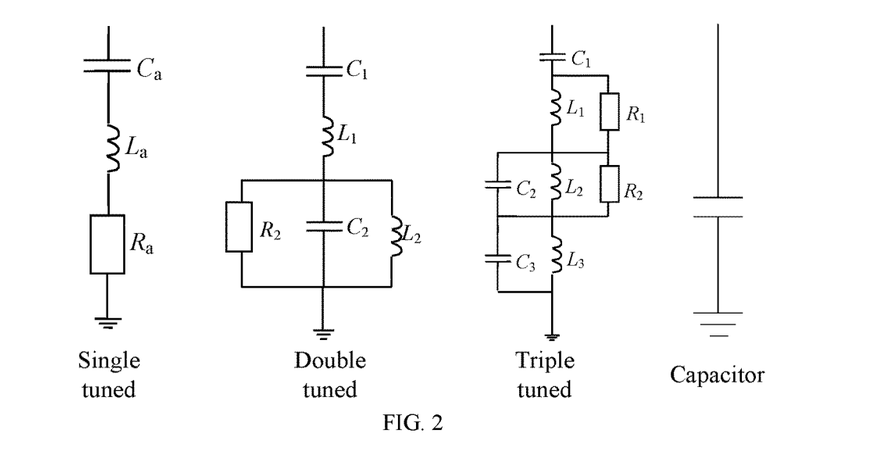
FIG. 2 is a topology diagram of an AC filter of an offshore converter station according to an embodiment of the present disclosure.

The AC filters 1-4 of the offshore converter station 1 are directly installed on the first AC bus 1-1 and can be single tuned, double tuned or triple tuned filters, or in a capacitor-only form, as shown in FIG. 2. The double tuned filter is used in this embodiment, and the reactive power of the AC filters 1-4 at a rated fundamental voltage is set to 10% of the rated DC power of the offshore converter station.

Figure 3:
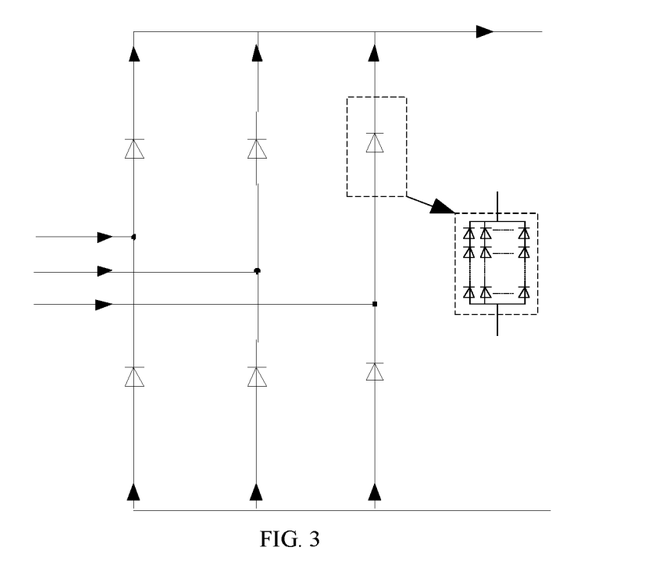
FIG. 3 is a topology diagram of an uncontrolled rectifier bridge of an offshore converter station according to an embodiment of the present disclosure.

The first converter 1-3 of the offshore converter station 1 is a three-phase six-pulse uncontrolled rectifier bridge, and each arm of the first converter 1-3 is composed of a number of cascaded diodes, as shown in FIG. 3. The two first converter transformers 1-2 are connected in Y0/Δ-configuration and Y0/Y-configuration, respectively, with a phase difference of 30° between the converter side windings of the two first converter transformers 1-2.

Figure 4:
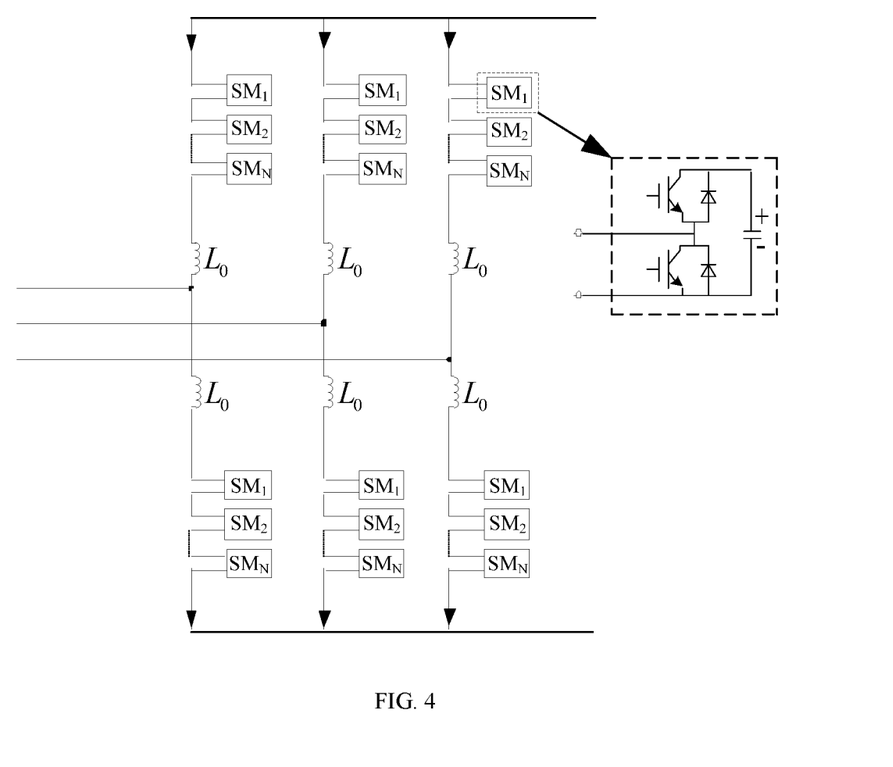
FIG. 4 is a topology diagram of MMC of an onshore converter station according to an embodiment of the present disclosure.

The onshore converter station 2 is comprised of a second AC bus 2-1, a second converter transformer 2-2, a second converter 2-3, and two second smoothing reactors 2-4. The second AC bus 2-1 is connected to the AC terminal of the second converter 2-3 by means of the second converter transformer 2-2. The DC side high voltage terminal of the second converter 2-3 is connected to the positive DC submarine cable by means of one second smoothing reactor 2-4, while the DC side low voltage terminal of the second converter 2-3 is connected to the negative DC submarine cable by means of the other second smoothing reactor 2-4. The second converter 2-3 is a modular multilevel converter (MMC), the topology of which is as shown in FIG. 4. The second converter transformer 2-2 is connected in Y0/Δ-configuration, and a star-connected reactor is used for grounding at the valve side of the converter transformer.

Figure 5:
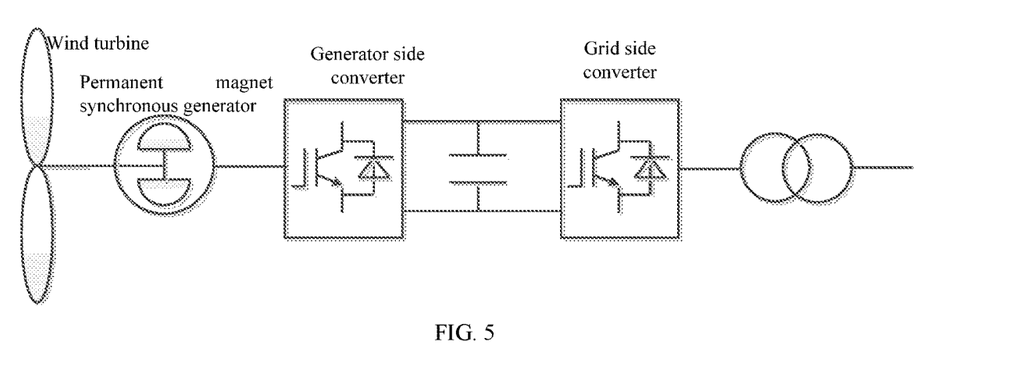
FIG. 5 is a topology diagram of a wind turbine according to an embodiment of the present disclosure.

The offshore AC system mainly includes wind turbines 3, AC submarine cables, and offshore step-up stations 4. Three wind turbines 3 are used as an equivalent wind farm connected to the low voltage side of each offshore step-up station 4. The high voltage sides of the offshore step-up stations 4 are connected to the first AC bus 1-1 of the offshore converter station 1 by means of the AC submarine cables. The rated frequency of the offshore AC system is chosen to be 150 Hz. The wind turbine is a wind turbine based on a permanent magnet synchronous generator with full-scale power converters, as shown in FIG. 5.

Figure 6:
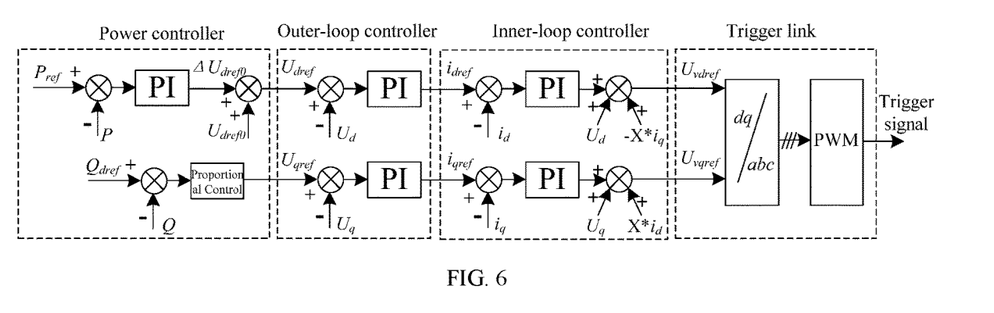
FIG. 6 is a schematic diagram of a control structure for a grid side converter of a wind turbine according to an embodiment of the present disclosure.

The wind turbine is subject to constant power control, as shown in FIG. 6 which is a structure block diagram of controllers, including four parts, namely a power controller, an outer-loop controller, an inner-loop controller, and a trigger link, where each controller includes d-axis and q-axis control dimensions, and inputs and outputs of all the controllers are per-unit values.

The system parameters in this embodiment are as shown in Table 1:

TABLE 1

| Item | Value |
| --- | --- |
| Parameters of Offshore Converter Station | |
| Rated DC voltage (between positive and negative poles) | 500 kV |
| Rated converter station power | 1000 MW |
| Converter transformer ratio | 230 kV/194 kV |
| Converter transformer capacity | 603 MVA |
| Converter transformer leakage reactance | 0.18 pu |
| Smoothing reactor inductance | 0.1 H |
| Rated AC fundamental frequency | 150 Hz |
| Reactive power of AC filter at rated fundamental voltage | 100 MVar |
| AC filter tuned harmonic order | 10.98, 12.98 |
| Parameters of Onshore Converter Station | |
| Rated DC voltage (between positive and negative poles) | 500 kV |
| Rated converter station power | 1000 MW |
| Converter transformer ratio | 230 kV/250 kV |
| Converter transformer capacity | 1200 MW |
| Converter transformer leakage reactance | 0.18 pu |
| Number of cascaded sub-modules in each arm | 250 |
| Sub-module capacitance | 13333 uF |
| Arm inductance | 47.49 mH |
| Smoothing reactor inductance | 0.1 H |
| Rated AC fundamental frequency | 50 Hz |
| Star-connected reactor inductance | 2 H |
| Grounding resistance | 5000 Ω |
| Offshore step-up stations 1-3 | |
| Transformer capacity | 200 MVA/500 MVA/300 MVA |
| Transformer leakage reactance | 0.10 pu |
| Transformer ratio | 35 kV/230 kV |
| Rated fundamental frequency | 150 Hz |
| Equivalent wind turbines 1 to 3 | |
| Rated power | 200 MW/500 MW/300 MW |
| Rated fundamental frequency of grid side converter | 150 Hz |

Figure 7:
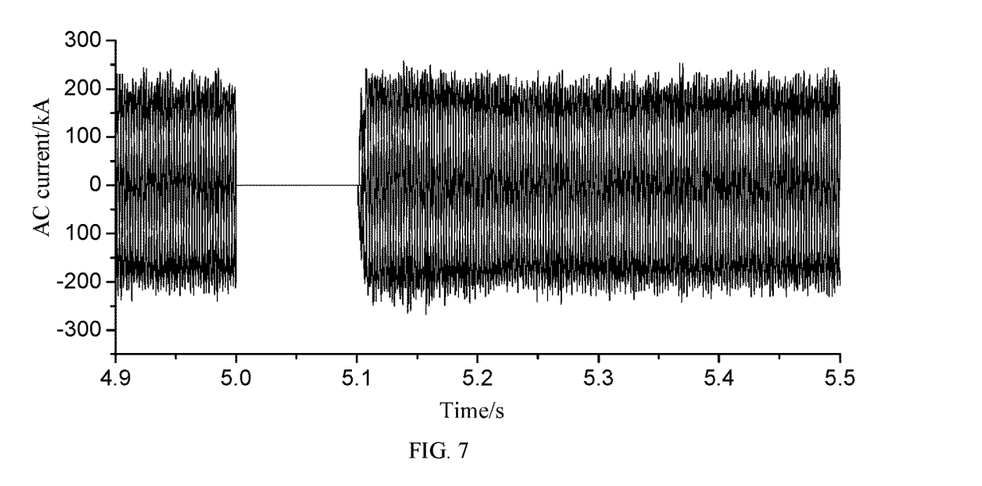
FIG. 7 is a schematic diagram of a simulated AC voltage waveform of an offshore converter station according to an embodiment of the present disclosure.
Figure 8:
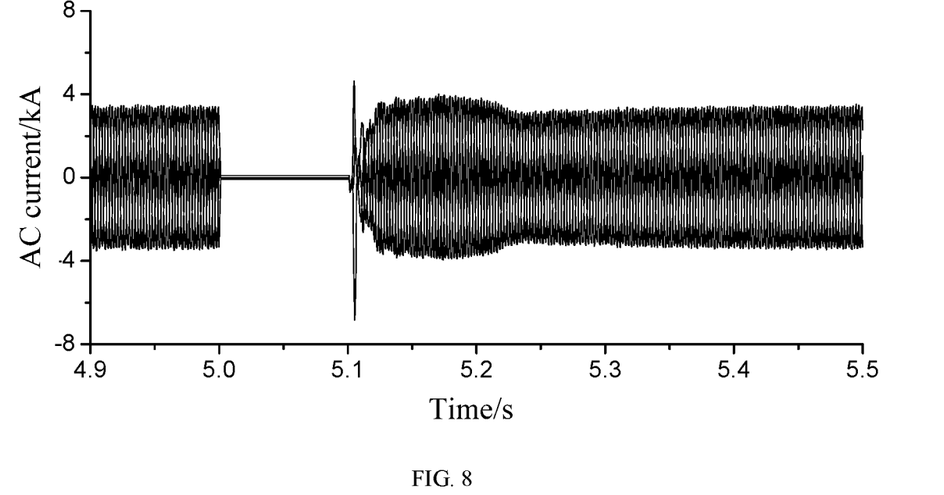
FIG. 8 is a schematic diagram of a simulated AC current waveform of an offshore converter station according to an embodiment of the present disclosure.
Figure 9:
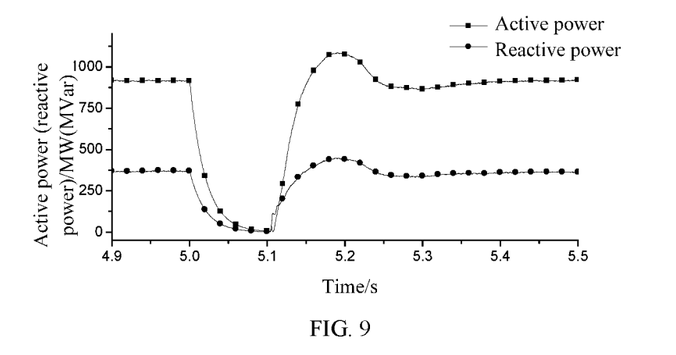
FIG. 9 is a schematic diagram of simulated active and reactive power waveforms of an offshore converter station according to an embodiment of the present disclosure.
Figure 10:
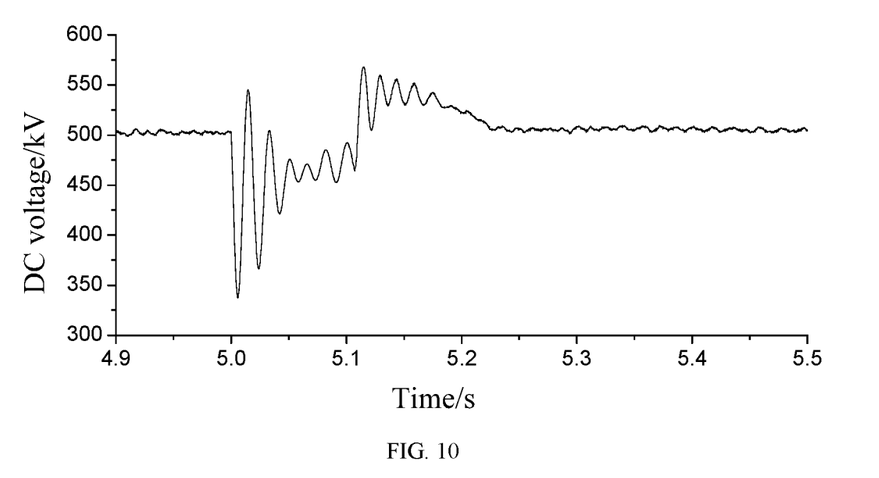
FIG. 10 is a schematic diagram of a simulated DC voltage waveform of the system according to an embodiment of the present disclosure.
Figure 11:
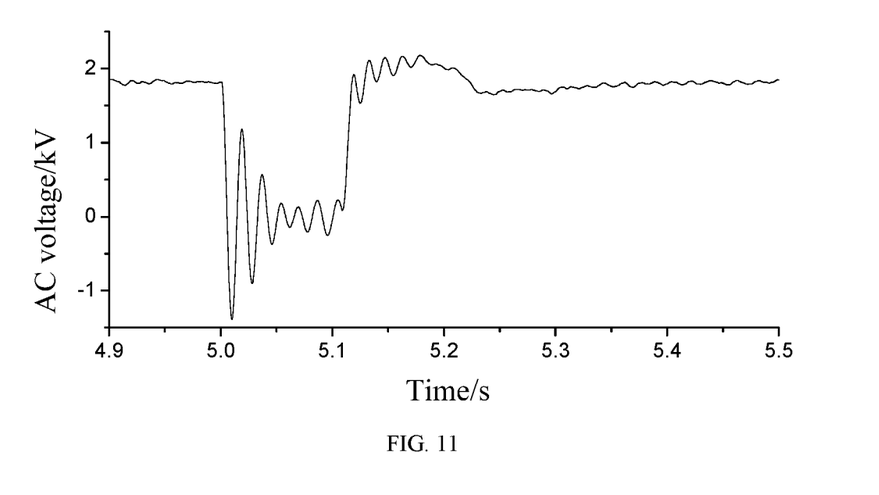
FIG. 11 is a schematic diagram of a simulated DC current waveform of the system according to an embodiment of the present disclosure.
Figure 12:
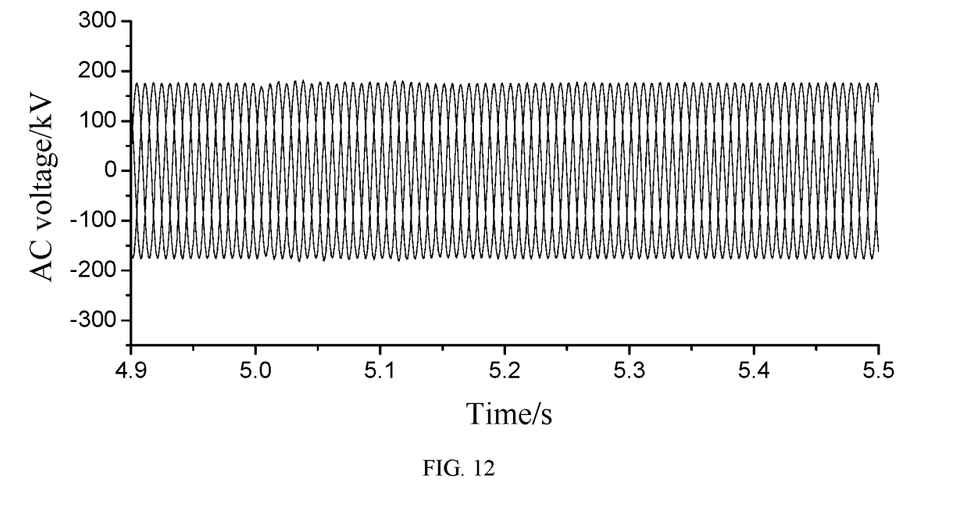
FIG. 12 is a schematic diagram of a simulated AC voltage waveform of an onshore converter station according to an embodiment of the present disclosure.
Figure 13:
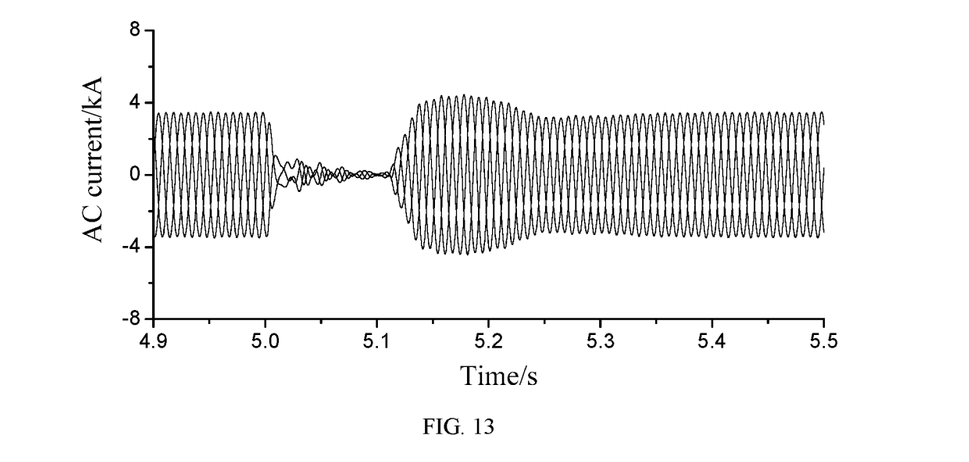
FIG. 13 is a schematic diagram of a simulated AC current waveform of an onshore converter station according to an embodiment of the present disclosure.
Figure 14:
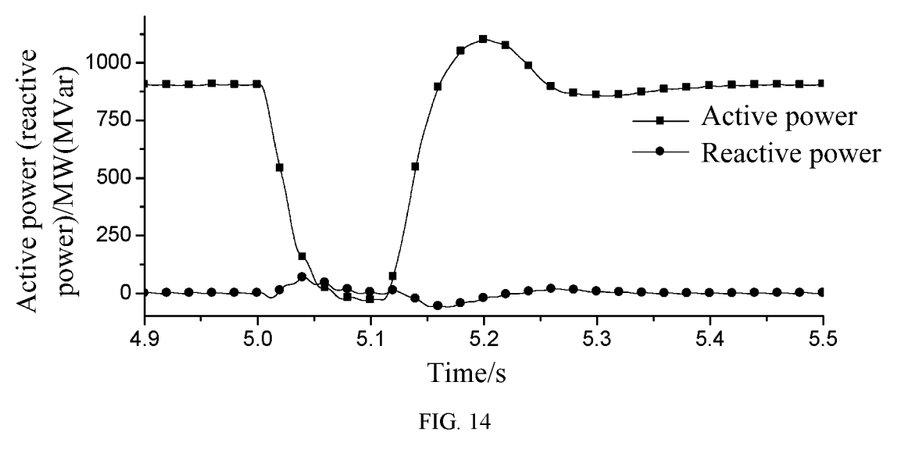
FIG. 14 is a schematic diagram of simulated active and reactive power waveforms of an onshore converter station according to an embodiment of the present disclosure.

A corresponding simulation platform was built in Power Systems Computer Aided Design/Electromagnetic Transients including DC (PSCAD/EMTDC) to simulate three-phase metallic short-circuit fault at the first AC bus 1-1 of the offshore converter station 1. It was assumed that the fault occurred at the fifth second during simulation, with simulation results of critical electrical quantities of the offshore converter station 1 shown in FIG. 7 to FIG. 9, simulation results of DC voltage and DC current shown in FIG. 10 to FIG. 11, and simulation results of critical electrical quantities of the onshore converter station 2 shown in FIG. 12 to FIG. 14. These simulation results demonstrated the effectiveness of the present disclosure.

While the embodiments of the present disclosure are described in detail above with reference to the accompanying drawings, the present disclosure is not limited to the described embodiments, and various variations can be made by those of ordinary skill in the art in the context of their knowledge without departing from the spirit of the present disclosure.

What is claimed is:

1. A high-frequency uncontrolled rectifier-based DC transmission system for an offshore wind farm, comprising a direct current (DC) system and an offshore alternating current (AC) system, wherein the DC system comprises an offshore converter station and an onshore converter station; and wherein the offshore AC system comprises wind turbines, AC submarine cables, and offshore step-up stations; wherein the wind turbines are connected to lower voltage sides of the offshore step-up stations by means of the AC submarine cables;

high voltage sides of the offshore step-up stations are connected to a first AC bus of the offshore converter station by means of the AC submarine cables; and the offshore converter station is connected to a DC side of the onshore converter station by means of DC submarine cables; and wherein each of the offshore AC system and the offshore converter station has a rated frequency of 100 to 400 Hz;

parameters of a step-up transformer in the offshore step-up station are matched with the rated frequency of the offshore AC system; and parameters of one or more first converter transformers in the offshore converter station are matched with the rated frequency of the offshore converter station;

wherein the high-frequency uncontrolled rectifier-based DC transmission system further comprises a control system used to perform constant power control on a grid side converter of a wind turbine;

the control system comprises four parts: a power controller, an outer-loop controller, and inner-loop controller, and a trigger link, wherein each of the power controller, the outer-loop controller, the inner-loop controller and the trigger link has d-axis and q-axis control dimensions;

an active power reference value $P_{ref}$ and a measured active power value P of the wind turbine are input as d-axis components of the power controller, the active power reference value $P_{ref}$ and the measured active power value P of the wind turbine are subtracted from each other and then subjected to proportion-integral (PI) control, thus producing an output of $\Delta U_{dref}$ is added to a d-axis voltage rating $U_{dref(\ )}$, resulting in a d-axis voltage reference value $U_{dref}$, a reactive power reference value $Q_{ref}$ and a measured reactive power value Q of the wind turbine are input as q-axis components of the power controller; the reactive power reference value $Q_{ref}$ and the measured reactive power value Q of the wind turbine are subtracted from each other and then subjected to proportional control, thus producing an output of q-axis voltage reference value $U_{qref}$;

a d-axis component $U_d$ and a q-axis component $U_q$ of an AC output voltage of the grid side converter, and the d-axis voltage reference value $U_{dref}$ and the q-axis voltage reference value $U_{qref}$ are input to the outer-lop controller, the d-axis voltage reference value $U_{dref}$ and the d-axis component $U_d$ of the AC output voltage of the grid side converter are subtracted from each other and then subjected to PI control, thus producing an output of d-axis current reference value $i_{dref}$, the q-axis voltage reference value $U_{qref}$ and the q-axis component $U_q$ of the AC output voltage of the grid side converter are subtracted from each other and then subjected to PI control, thus producing an output of q-axis current reference value $i_{qref}$;

a d-axis component $i_d$ and a q-axis component $i_q$ of an AC output current of the grid side converter, the d-axis current reference value $i_{dref}$ and the q-axis current reference value $i_{qref}$, and a d-axis AC output voltage component $U_d$ and a q-axis AC output voltage component $U_q$ are input to the inner-loop controller, the d-axis current reference value $i_{dref}$ and a d-axis AC output current component id are subtracted from each other and then subjected to PI control, thus producing an output result which is added to $U_d$-$i_q$*X resulting in a d-axis voltage modulated waveform $U_{dref}$, the q-axis current reference value $i_{qref}$ and a q-axis AC output current component $i_q$ are subtracted from each other and then subjected to PI control, thus producing an output result which is added to $U_q$+$i_d$*X, resulting in a q-axis voltage modulated waveform $U_{vdref}$, wherein X denotes connection reactance of the grid side converter; and the d-axis voltage modulated waveform $U_{vdref}$ and the q-axis voltage modulated waveform $U_{vqref}$ are input to the trigger link and then subjected to dq/abc transformation and pulse width modulation (PWM), thus outputting trigger signals to different switching elements in the grid side converter.

2. The high-frequency uncontrolled rectifier-based DC transmission system for an offshore wind farm according to claim 1, wherein the DC system is a symmetrical monopolar structure.

3. The high-frequency uncontrolled rectifier-based DC transmission system for an offshore wind farm according to claim 1, wherein the wind turbine is a wind turbine based on a permanent magnet synchronous generator with full power converters.

4. The high-frequency uncontrolled rectifier-based DC transmission system for an offshore wind farm according to claim 1, wherein the offshore converter station comprises the first AC bus, two first converter transformers, two first converters, an AC filter, and two first smoothing reactors; wherein
the first AC bus is connected to AC sides of the first converters by means of the first converter transformers; the two first converters are respectively a positive converter and a negative converter; a DC side high voltage terminal of the positive converter is connected to a positive DC submarine cable by means of one first smoothing reactor, and a DC side low voltage terminal of the positive converter is connected to a DC side high voltage terminal of the negative converter; and a DC side low voltage terminal of the negative converter is connected to a negative DC submarine cable by means of the other first smoothing reactor.

5. The high-frequency uncontrolled rectifier-based DC transmission system for an offshore wind farm according to claim 4, wherein the AC filter is mounted on the first AC bus; the AC filter is a single tuned, double tuned or triple tuned filter, or in a capacitor-only form; and a total reactive power of all AC filters at a rated fundamental voltage is 10% of rated DC power of the offshore converter station.

6. The high-frequency uncontrolled rectifier-based DC transmission system for an offshore wind farm according to claim 4, wherein:
each of the two first converters is a three-phase six-pulse uncontrolled rectifier bridge, each arm of which is composed of a plurality of diodes connected in series and parallel;
AC bus side windings of the two first converter transformers are connected in a same configuration; and converter side windings of the two first converter transformers are connected in different configurations, with a phase difference of (2k+1)*30°, k=0, 1, 2, . . . , 5.

7. The high-frequency uncontrolled rectifier-based DC transmission system for an offshore wind farm according to claim 1, wherein the onshore converter station comprises a second AC bus, a second converter transformer, a second converter, and two second smoothing reactors; wherein
the second AC bus is connected to an AC terminal of the second converter by means of the second converter transformer;
a DC side high voltage terminal of the second converter is connected to a positive DC submarine cable by means of one second smoothing reactor, while and a DC side low voltage terminal of the second converter is connected to a negative DC submarine cable by means of the other second smoothing reactor; and
the second converter is a modular multilevel converter (MMC); an AC bus side winding of the second converter transformer is connected in Y0-configuration; and a converter side winding of the second converter transformer is connected in Δ-configuration plus a star-connected reactor, or in Y-configuration with large resistance grounding at neutral point.

* * * * *